United States Patent Office 3,190,119
Patented June 22, 1965

3,190,119
APPARATUS FOR DETERMINING THE WEIGHT
OF CARGO ON BOARD A SHIP
Takashi Isobe, 252 Akazutsumicho-1-chome, Setagaya-ku, Tokyo, Japan, and Yuichi Yamane, 10 Kikusuicho-5-chome, Hyogo-ku, Kobe, Japan
Filed July 31, 1961, Ser. No. 128,228
4 Claims. (Cl. 73—302)

The present invention relates to measurement of cargo weight aboard a ship and particularly to a method of collectively determining the weight of general or bulk cargo aboard a ship.

In this field of weight measurement, the so-called "draft survey" method has long been in use. According to this system, the net weight of cargo on the ship is obtained by calculation from the weight of the water displaced by the ship minus the net weight of the ship when it is empty. The accuracy of this old weighing system is said to be as low as $1/120$ in average error and with the recent marked progress of general measuring techniques, the system as it was has come to be regarded as inadequate for use as a means for confirming the weight of cargo wihen it is loaded or delivered. Thus, the cargo weight given by the draft survey method is now only usable as a reference.

According to the present practice, so-called bulk cargo, such as ore steel scrap, phosphate rock, salt, lime, bulk food, bulk fodder and other industrial material, is generally loaded into the ship's cargo compartments after weighing and recording the weight of the cargo, transported on board the ship to the destination, and there for discharging again weighed for collation with the record made at departure thereby to know the presence or absence of any accident or fraudulence during the transportation. Such weighing practice in ship transportation involves a drawback that a great deal of labor and time is necessitated in loading and unloading cargo and particularly in its weighing, and an inconvenience that any cargo cannot be finally delivered without the individual and direct weight inspection of the cargo being unloaded. The bulk cargo comprises generally raw material for industries which is being carried to the point of use, but the flow of such raw material is inevitably interrupted at points where it is transferred between the ship and shore. This status is far from satisfying the demand of the time.

The fact that the conventional "draft survey" method involves substantial errors may be attributable to the following reasons:

(a) The draft markings must be visually read and it is said that even the readings given by an expert surveyor involve an error of the order of about 30 mm.

(b) Additonal error is involved which is derived from the inaccuracy in the deadweight scale ("blue plan") provided on board the ship, particularly when the ship age is old.

(c) Accurate determination of the specific weight of the sea water, which naturally depends upon the salt and microbe contents of the local sea water, is very difficult and nearly impossible because of time and other limitations in actual cargo handling, particularly when the layers of sea water at different depths have different specific gravity because of the varying weather conditions during the period of anchorage.

(d) Variation in specific weight of the sea water with temperature is substantial, i.e., the temperature rise from 0° C. to 15° C. represents an increase of approximately 7.39 tons in weight of 10,000 tons of fresh water.

In the draft survey, the tonnage of cargo is determined by performing complicated calculations considering these and other factors such as the constant weight and weights of heavy mobile objects on board the ship, and thus naturally involves a certain degree of error as pointed up above.

The present invention has for its object to avoid the deficiencies in the conventional weighing practice by making it possible to weigh the cargo as it is taken aboard and also at the port of destination to weigh the cargo as it is still aboard the ship by reading a pressure indicator scale equipped on board for collation with the weight records made at the port of departure thereby to know the presence or absence of any accident to the cargo during the transportation and thus to expedite the cargo delivery.

It has long been known in practice to obtain the volume of fluid in a reservoir tank or the like by measuring the back pressure of the air being discharged through the fluid, but it has never been known to the trade to determine the draft of a ship and hence the cargo weight carried thereby upon the basis of the back pressure required for the air to be discharged at the level of the ship's bottom through the water. This conception is a basis of the present invention, and according to the present invention the draft of a ship may be determined directly with such an accuracy as 1 mm. or less as will be made apparent hereinafter.

According to the present invention, there is provided a method of determining the weight of cargo on board a ship which comprises arranging at least one air tube broadside of the ship so as to extend vertically downwardly to open at the bottom under the water surface, connecting a graduated measuring instrument with said air tube at the top thereof, and forcing air into said air tube so that said measuring instrument indicates an air pressure established in the system which corresponds to the depth of the bottom open end of the air tube as measured from the water level surface.

Another object of the present invention is to provide an apparatus for weight measurement of the kind described which comprises means for detecting the air pressure established in the system with high accuracy so as to enable accurate weight measurement.

According to the present invention, there is also provided an apparatus for determining the weight of cargo on board a ship which comprises at least one air tube arranged broadside of the ship and vertically downwardly extending to open at the bottom under the water surface, and a graduated measuring instrument in communication with said air tube at the top thereof, said apparatus further comprising a pair of electric contacts or electrodes arranged opposite to each other on said air tube adjacent air escape apertures formed at the bottom thereof, said opposite electric contacts being arranged so as to be electrically connected to or separated from each other as the space between electrodes is filled, respectively, with water in the air tube or with air forced into the air tube to depress the water level therein thereby to open the electric circuit including the electrodes, it being arranged so that the opening and closing of such electric circuit is indicated by an indicating instrument associated therewith to allow accurate and precise determination of the boundary state between the electrical connection and separation of the opposite electrodes for accurate measurement of the air pressure established within the air system so as to correspond to the depth or vertical spacing between the water level and the level of air escape apertures at the tube bottom.

The present invention will now be described in detail with reference to the accompanying drawings which illustrate diagrammatically some preferred embodiments. In the drawings.

Figure 1:
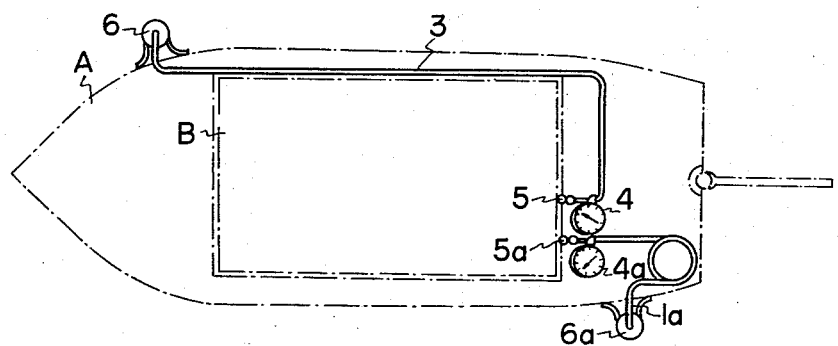
FIG. 1 is a schematic plan view showing one embodiment of the present invention.
Figure 2:
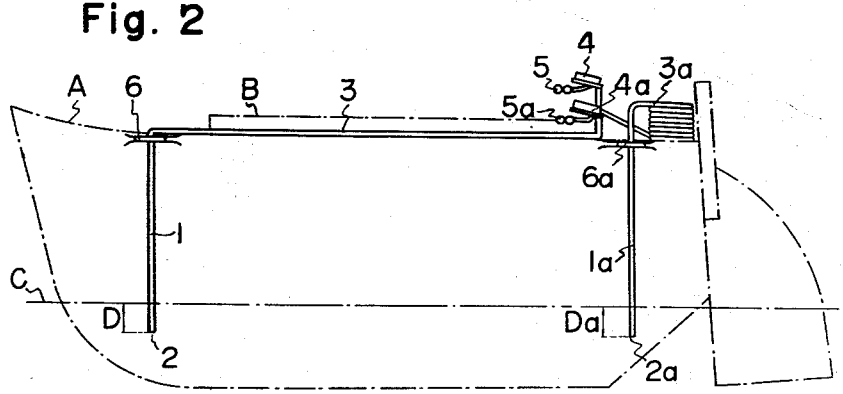
FIG. 2 is a schematic side elevation of the embodiment shown in FIG. 1.

Referring to the drawings, particularly to FIGS. 1 and 2, there is shown one embodiment of the present invention as applied to a ship or vessel shown in chain lines and comprising a body A having a cargo space B defined therein, reference character C in FIG. 2 designating the water level around the ship.

Narrow air tubes 1 and 1a are disposed on the respective broadsides of the ship and are made for example of stainless steel or glass. One of the air tubes 1 is detachably mounted at the bow of the ship while the other air tube 1a is detachably mounted at the stern. The air tubes may carry graduations as desired. The locations where the respective air pipes are mounted are important as the air pipes serve to give respective air pressures the mean value of which pressures provides the basis of weight determination of cargo on board the ship. Thus, in order to obtain the average draft of the ship at any particular time and ship location, air pipes, preferably two in number, are mounted one on the shoulder portion of the cargo space or "on" deck on the bow side thereof and the other on the waist portion at the stern on the opposite broadside at respective locations such that the midpoint of the diagonal line joining the two locations forms the reference point for draft determination which aligns with the intersections of the four diagonals of the ship structure.

The air pipes each open at the bottom end as indicated at 2 and 2a, respectively, and are positioned so that the openings 2, 2a are at the same depth D (Da) from the water level C when the ship is empty and substantially at the same level as the bottom of the imaginary rectangular hull corresponding to that of the actual ship on which the weighing system is mounted. The air pipes are each connected at the top to respective air conduits 3, 3a which in turn are connected to respective measuring instruments 4, 4a for air pipes 1 and 1a, respectively.

The air lines connecting the air pipes 1, 1a with the respective measuring instruments 4, 4a are laid out so as to have the same overall length from the respective air pipes to the associated measuring instruments 4, 4a.

In operation, air is forced into each of the air pipes 1, 1a so that the air escapes through the bottom opening thereof thereby to establish within the air pipe and hence the associated air line an air pressure corresponding to the water pressure at the level of the bottom pipe opening. The air pressure in the air line is determined by the associated measuring instrument 4 or 4a having an accuracy as desired. It will be appreciated that any difference between the pressure values obtained in this manner for the empty and loaded states of the ship corresponds to the weight of the cargo loaded. It will be understood that the correlation between the air pressure in the air line or the water pressure at the bottom of the corresponding imaginary hull and the total weight of cargo is preliminarily determined by use of loads of known weight.

The imaginary rectangular hull as referred to hereinbefore is one having a rectangular transverse cross section having the same area as that portion of the transverse cross section of the actual hull which lies below the line of draft of the particular ship. It is assumed that the imaginary rectangular hull has a width the same as that of the corresponding actual hull as measured at the level of water line or the imaginary hull has its sides extending vertically through the line of draft of the actual ship.

Arranged adjacent to the junction of the air conduits with the associated measuring instruments are independent air pumps 5 and 5a of a suitable type for separately forcing air through the air conduits into the respective air pipes 1, 1a. Secured to the ship structure adjacent to the respective air pipes are support brackets 6 and 6a for detachably supporting the respective vertical air pipes 1 and 1a preferably for free pivotal movement as described later in further detail.

In general, the sea has more or less waves at all times under the influence of the wind and the surface of the sea is not planar. However, as is well known, a definite and substantially constant water surface is observed in an open-ended pipe of glass positioned vertically across the sea surface at the same level as that of the surrounding sea surface around the vertical glass pipe. The water surface which is formed in a vertical pipe and the level of which is taken as a datum for pressure determination as described above may thus be assumed flat and smooth like the surface of a glass sheet even when the sea surface around the pipe actually has more or less waves as is usual in a common port or harbor. It will be recognized that the water surface in such vertical pipe may be employed as a datum for draft measurement.

In use, the apparatus illustrated in FIGS. 1 and 2, is operated in the following way. Firstly, when the ship is empty, the air pipes 1, 1a are adjusted so that the bottom openings 2 and 2a formed in the respective air pipes 1 and 1a are placed at the same depth D or Da with respect to the sea surface with the measuring instruments each set to the reference point such as zero mark on the graduated scale of the instrument. The air pumps 4 and 4a are then operated to force air into the air pipes independently from each other. The air pressure required initially to extrude the entire water column in the air pipes is the same for both of the air pipes so that the pointers of the measuring instruments associated with the respective air pipes principally must indicate the identical scale marks. The identical readings are recorded on the inspection or survey note.

Secondly, successive lots of cargo are loaded aboard the ship and the readings as indicated in the measuring instruments 4 and 4a are taken and recorded out every time each lot of cargo is loaded until the cargo space has been filled. In this procedure, the readings of the two measuring instruments are separately taken and recorded as suggested hereinbefore. After the completion of such procedure, the two series of scale readings recorded are averaged to give figures to be entered in a regular survey sheet particularly prepared for the purpose.

Figure 3:
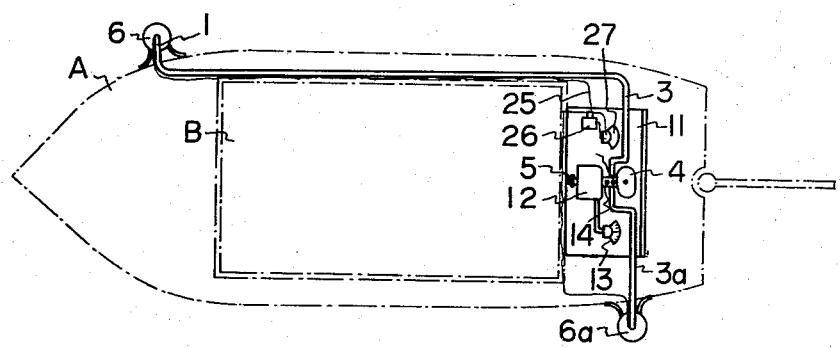
FIG. 3 is a schematic plan view similar to FIG. 1 of another embodiment of the invention, showing the mounting of the apparatus on the ship structures.
Figure 4:
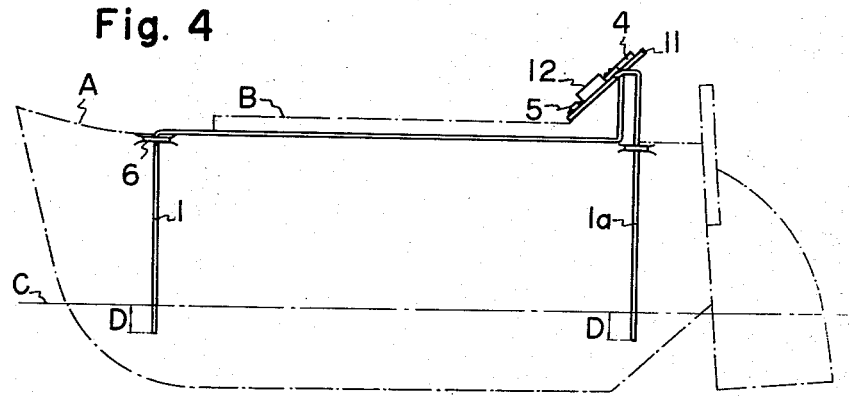
FIG. 4 is a view similar to FIG. 2 of the embodiment shown in FIG. 3.
Figure 5:
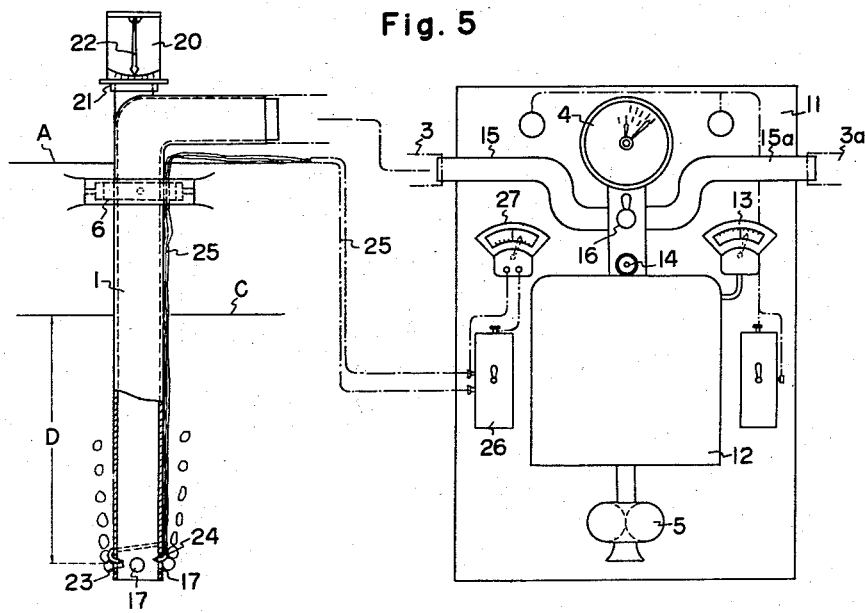
FIG. 5 is a diagrammatic view of the apparatus shown in FIGS. 3 and 4 with part of the air line broken away for clarity's sake.

Another embodiment of the present invention is illustrated in FIGS. 3 to 5. In the drawings including these figures, like reference letters or numerals indicate like parts or members in the two embodiments of the invention, and those parts carrying such reference letters or numerals will not be described again in connection with the second embodiment for convenience's sake.

Referring to FIGS. 3 to 5, there is provided on the ship at a suitable point at inclined mounting platform 11 which carries a compressed air reservoir 12 connected with an air pump 5 to collect compressed air therefrom. A pressure gauge 13 is connected to the air reservoir 12 to indicate the air pressure therein. Also connected to the air reservoir 12 by way of a pressure regulator valve 14 are a pressure gauge 4 and connector pipes 15 and 15a adapted to receive respective air conduits 3 and 3a extending to the starboard and port side of the ship. A changeover valve 16 is provided at the junction of the two air conduits 7 and 7a to selectively place either of the two conduits in communication with the air supply source.

Reference numerals 1 and 1a denote measuring tubes or open-ended air pipes having each adjacent to the open bottom a number of side apertures 17 for allowing air to escape from within the airpipe 1 or 1a. The air pipes are supported at the top for free pivotal or tilting movement by respective support brackets 6 and 6a so as to extend downwardly along the respective sides of the ship. The support brackets may take any desired form suited for the intended purpose. In case of a ship structure made of wood, each of the support brackets may preferably comprise a metal fixture (not shown) secured to a suitable point on the ship structure, a support arm detachably mounted on said fixture so as to extend beyond the adjacent side of the ship to provide a gyroscopic fulcrum point for vertically supporting the air pipe 1 or 1a so that the latter may be held substantially vertical irrespective of the rocking movement of the ship and is free for vertical displacement relative to the ship structure. In this case, the measuring instrument, air pipes and air conduits for connecting the latter with the instrument may preferably be made detachable and suited to be carried along on board a specialized cargo-surveying vessel. With large ships, however, the measuring instrument is preferably secured in the bridgehouse of the ship with the vertical measuring tubes or air pipes also secured to the hull.

Again referring to FIGS. 3 to 5, compressed air is supplied from the air reservoir 12 through the air conduits 3 and 3a to the top of the respective measuring tubes 1 and 1a.

The measuring tubes 1 and 1a are required to maintain their verticality at all times as far as possible. However, the measuring tubes are naturally caused to tilt or incline to some extent relative to the vertical by rocking movement of the ship, tidal flow, wind and waves and other external factors. For the purpose of determining and correcting such inclination of the measuring tubes, there is provided in the embodiment shown in FIGS. 3 to 5, a kind of clinemeter 20 at the top of each of the measuring tubes 1 and 1a. Referring particularly to FIG. 5, the clinemeter comprises a base 21 rotatably mounted on the top of the measuring tube 1, so that a pointer 22 freely suspended above the base 21 may turn in the same direction as that in which the measuring tube is inclined.

As described hereinbefore, in use of the apparatus of the invention, air is forced into the measuring tube at the top thereof until air bubbles are formed at the bottom to rise through the surrounding water, which indicates that the air pressure in the tube has been set in equilibrium with the water pressure at the bottom pipe end. This may be observed from the associated pressure gauge, which is connected with the top of the measuring tube by way of air conduit 3 or 3a, as the pointer comes to rest indicating the equilibrium attained between the air and water pressures. In practice, however, the pressure gauge pointer can hardly be stabilized or set at a fined position because of the frictional drag effected by the wall of the air conduit having a substantial length upon the flow of air passing therethrough and irregularities in the forced supply of air. This makes it difficult to read the pressure gauge as will readily be understood.

To overcome such difficulties and thereby to improve the accuracy of weight measurement, according to a further feature of the present invention, a pair of electric contacts or electrodes 23 and 24 are mounted opposite to each other on the bottom portion of the measuring tube along the upper edges of the respective apertures 17 (FIG. 5), which are formed in the tube bottom as described above. An electric cord 25 connects the electrodes 23 and 24 to an electric battery 26 mounted on the platform 11 on opposite sides of the air reservoir 12. An indicator 27 is connected in series in the electrode circuit as shown.

In use of the apparatus shown in FIGS. 3 to 5, firstly, air pump 5 is operated to force air under pressure into the air reservoir 12, and then the change-over valve 16 is operated so as to communicate, for example, the left-hand air conduit 3 with the air reservoir 12. By gradually opening the pressure regulator valve 14, the air from the reservoir is passed through the air conduit 3 to the associated measuring tube or air pipe 1 to press down the water level therein discharging the water through the bottom opening of the pipe. The air pressure in the air line particularly in the pipe 1 is continuingly indicated on the pressure gauge 4. In the meantime, the air starts to escape out of the measuring tube in the form of bubbles. When the spacing between the electrodes 23 and 24 mounted on the bottom of the measuring tube is filled with water, which is electric-conductive, the circuit including the electrodes 23 and 24 is closed and the needle of the indicator 27 in the circuit is positioned on the scale side carrying the indicium "water." However, at the instant when the water connecting the two electrodes 23 and 24 is by displaced by the air forced into the tube, the circuit is opened shifting the indicator needle to the opposite side, which carries the indicium "bubble." At this time, part of the air now separating the electrodes escapes out in the form of bubbles to allow the water again to fill the electrode spacing to close the electrode circuit with the indicator needle positioned again on the "water" side of the indicator scale. Such oscillatory movement of the indicator needle between the "water" and "bubble" sides of the indicator scale corresponds to the very limited vertical reciprocatory displacement of the water level in the measuring tube 1. Under such conditions, the pressure regulator valve 14 is closed thereby to obtain a stationary boundary surface between the air and water within the measuring tube. The pressure of the air in the tube as indicated on the pressure gauge now precisely corresponds to a water pressure representing the depth D or the vertical distance between the draft level C and the water level within the measuring tube at the bottom thereof, which distance forms a measure of cargo weight as pointed out hereinbefore.

In the foregoing, the measuring procedure has been described in connection with the starboard side half of the inventive apparatus, but the same procedure is also followed with the port side half of the apparatus as will readily be understood.

For practical use of the embodiment shown in FIGS. 3 to 5, a survey or inspection sheet for the particular ship is preliminarily made out for the actual determination of cargo weight as with the case of the first embodiments shown in FIGS. 1 to 2. Namely, at first, the pressure gauge 4 is adjusted so that the marking on the gauge scale which corresponds to the vertical distance D between the draft line C and the level of air escape apertures 17 formed in the side wall of the measuring tube 1 at the bottom thereof as measured when the ship is empty shows zero. Next, the pressure regulator valve 14 is slowly opened to introduce air under pressure from the air reservoir 12 into the meausring tube 10. The point of equilibrium at the tube bottom between the air and water therein is then determined in the manner described hereinbefore and recorded in the survey sheet. The same procedure is repeated now for each of successive lots of cargo as described in connection with the first embodiment until the ship is full laden.

The survey sheet may now be completed just in the same manner as in the case of the first embodiment. The purpose of providing a pair of measuring tubes on the opposite broadsides in longitudinally spaced apart relation and averaging the values obtained with such respective measuring tubes is to avoid any inaccuracy in measuring the draft or displacement of the ship which may otherwise occur from the rolling and pitching movements of the hull or the irregularity of the draft line due to waves.

When it is desired to determine the weight of cargo on board the ship equipped with its survey sheet prepared in the manner as described hereinbefore, it is only necessary to mount the measuring tubes or air pipes 1 and 1a on the ship structure in the manner as specified in the survey sheet and to force air in the air pipes 1 and 1a for the purpose of taking readings of the pressure gauge or gauges for each loading or unloading of cargo. It will be appreciated that the weight of any cargo may be obtained as it is loaded on board without necessitating any separate weighing operation before leading the cargo. It will also be readily appreciated that, when any additional cargo is loaded or a part of cargo on board is to be unloaded en route, the weight of the additional cargo or the cargo being unloaded can be readily obtained from the readings of the pressure gauge or gauges associated with the measuring tubes, eliminating the need of directly weighing such lots of cargo as in the conventional cargo survey.

After determining the weight of cargo as the cargo is loaded or unloaded according to the present invention, the measuring tubes, meters including pressure gauges, and other components of the apparatus may be detached from the ship structure for use on another cargo vessel as required. In this case it may be convenient to provide a measuring set of the same kind at each of ports en route to be made use of in individual weighing operations.

It will be understood that the survey or inspection sheet for any particular vessel carrying the records of loads on board the ship and those discharged is prepared in triplicate, the three copies being to be kept by the ship owner, the surveyor and the ship authority respectively for expediting the cargo delivery.

Practical tests conducted by the inventor show that the present invention enables weight determination of cargo as loaded on board with an accuracy of $\frac{1}{2,000}$ or less which is comparable to that of any of conventional cargo weighing systems and that the invention is effective to make smooth the flow or passage of raw material between the ship and industrial plant thereby reasonably reducing the transportation cost of raw materials which is also a great benefit to any of trades concerned.

What is claimed is:

1. Apparatus for determining the total intake weight of cargo on board a ship, the apparatus comprising: at least one air pipe vertically mounted on said ship and having a downwardly facing opening at the level of the bottom of the ship, means for feeding air under pressure to said air pipe towards said opening, manometer means for determining the air pressure value in said air pipe necessary to substantially completely expel water from said air pipe through said opening, means for indicating the value of said total intake weights of cargo corresponding to the respective pressure values determined by said manometer means, a pair of opposite electrodes disposed in said air pipe adjacent said opening, means for producing an electric signal current in accordance with said electrodes selectively being in water and in air, movable means energized in accordance with said signal current, and means for stopping the feed of air under pressure from said air feeding means with said movable means assuming a predetermined position corresponding to expulsion of the water from said air pipe.

2. Apparatus as claimed in claim 1, wherein said ship has a hull of curved tapered shape and the opening of the air pipe is at a level corresponding to the bottom of a rectangular enclosure having a volume corresponding to that of the hull.

3. Apparatus as claimed in claim 1, comprising a plurality of pipes including the first said pipe positioned with respect to said ship in pairs such that a line joining each of the pairs passes through the intersection of diagonal lines of the rectangular enclosure.

4. A method of determining the weight of cargo on board a ship comprising supporting in related pairs open tubes extending from said ship into the water to a depth corresponding to the level of the bottom of a rectangular enclosure having a volume corresponding to that of the hull of the ship, the tubes of each of said pairs being arranged along a line which passes through the intersection of the diagonals of the rectangular enclosure, said tubes with said ship afloat containing water to a level corresponding to that of the surface of water, and introducing compressed air into the tubes to expel the water from the tubes to cause the level of the water in the tubes to be displaced to the level of the opening in the tubes, the magnitude of the pressure of the compressed air necessary to expel the water from the tubes being related to the gross weight of the ship such that the weight of cargo can be determined by the relation between the air pressure prior to loading cargo and subsequent to loading cargo.

References Cited by the Examiner

UNITED STATES PATENTS

| 1,971,806 | 8/34 | Bargeboer | 73—304 |
| 2,409,310 | 10/46 | Piper | 73—302 X |
| 3,110,181 | 11/63 | Calamaras et al. | 73—302 |

FOREIGN PATENTS 285,640   2/28   Great Britain.

ISAAC LISANN, *Primary Examiner.*
LOUIS R. PRINCE, *Examiner.*